Jan. 16, 1951  L. R. SHADDUCK  2,538,430
VEGETABLE SPLITTER
Filed Jan. 21, 1948  2 Sheets-Sheet 1
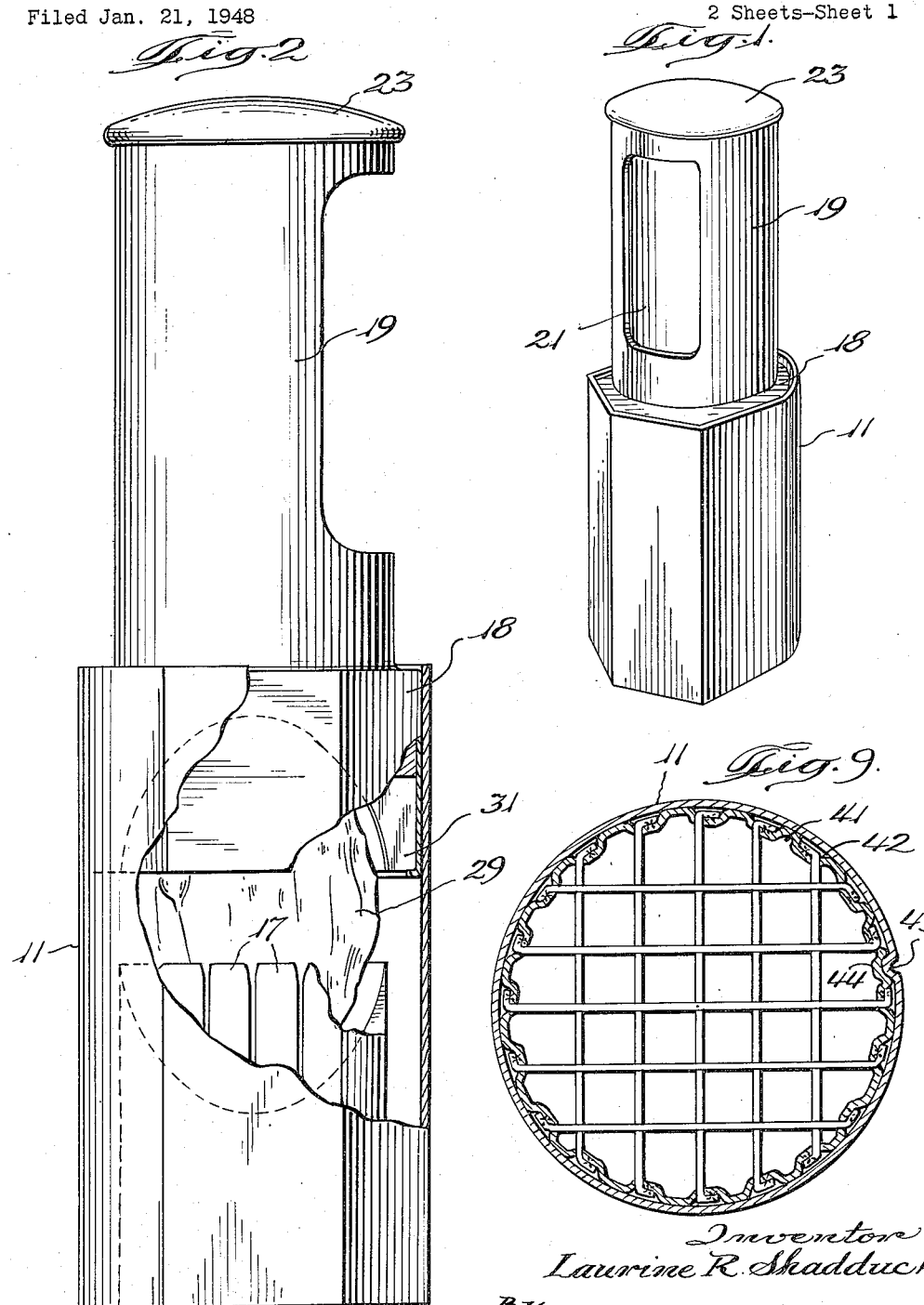
Inventor
Laurine R. Shadduck
By
Attorney Jan. 16, 1951 L. R. SHADDUCK 2,538,430
VEGETABLE SPLITTER
Filed Jan. 21, 1948 2 Sheets-Sheet 2
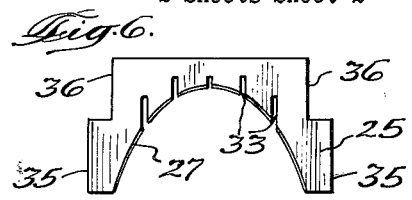
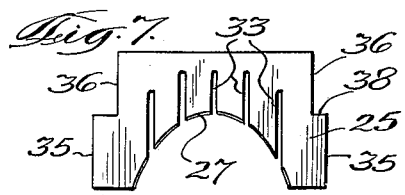
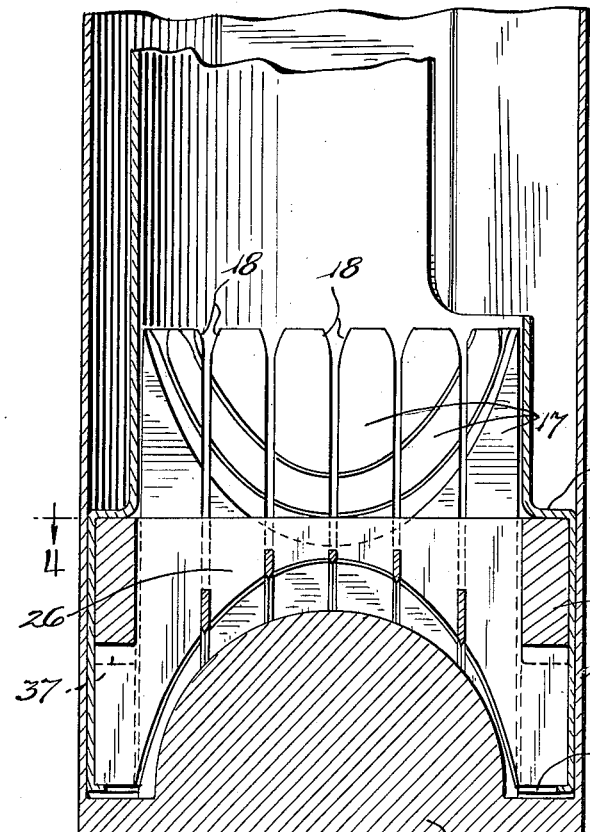
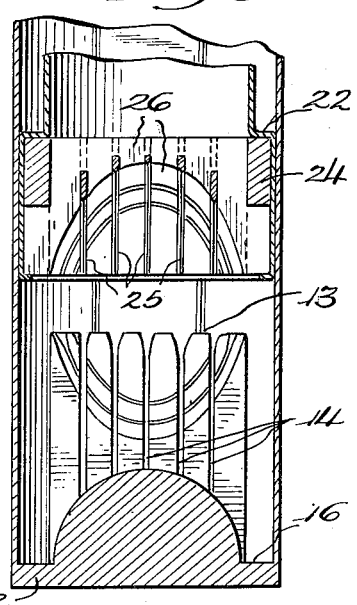
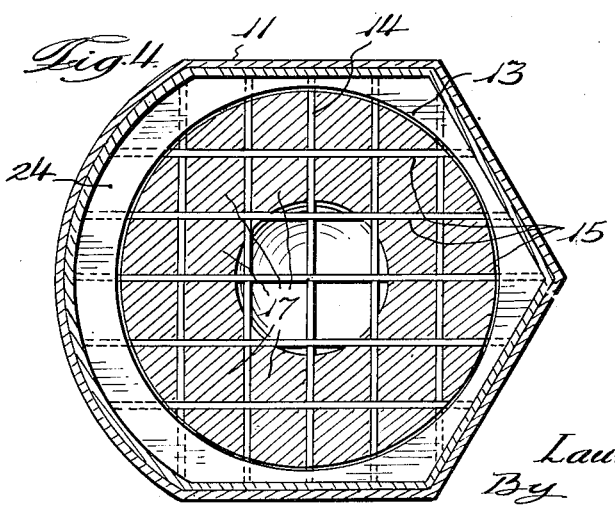
Inventor
Laurine R. Shadduck
By
S. Quellon
Attorney Patented Jan. 16, 1951

2,538,430

UNITED STATES PATENT OFFICE 2,538,430

VEGETABLE SPLITTER

Laurine R. Shadduck, Chicago, Ill.

Application January 21, 1948, Serial No. 3,390

3 Claims. (Cl. 146—160)

The present invention relates to food processing apparatus and is concerned more particularly with the provision of a utility device for splitting pulpy vegetable substances into longitudinal strips or shreds.

Various types of culinary practices are recognized as conventional or traditional and among these is the slicing of potatoes into longitudinal strips for preparation into a form commonly identified as "French fried" consisting essentially in substantial square cross-sectioned splittings which are then processed by immersion into hot frying greases or otherwise. For the purpose of table consumption, a householder may not practically or economically avail of the accommodations for slicing potatoes in this manner as is done under commercial or restaurant practices with industrial machinery. Consequently, for household purposes the user is obliged to slice the potato into a plurality of sections, thence to reslice these sections into strips. This practice is not only time consuming and significantly hazardous, but more frequently than not results in the production of irregular or non-conforming chips or sections. As a consequence, the frying operation may not be regulated so as to impart evenness in the preparation. Instead small potato particles are more crisply done than those of larger body and this result is deemed to be appreciably less desirable because it causes a variance in the degree of the frying.

The present invention comprises a design of potato splitter which will produce speedily, accurately and equally proportioned sections which will respond more evenly to the frying process and which will therefore cause to be produced more palatable and thoroughly regulated comestibles.

A principal object of the present invention is therefore the provision of a compact conveniently manipulated kitchen tool for splitting pulpy vegetables into longitudinal chips or sections, and one which will lend itself easily to cleansing while yet be operated without requiring more than ordinary skill and moderate force.

For a more comprehensive understanding of the invention, reference will now be had to the accompanying drawings and to the following detailed specification in which like reference numerals designate corresponding parts throughout; and in which, Fig. 1 is a perspective view of a vegetable splitter having embodied therein various features of the present invention;

Fig. 2 is a side elevational view with parts broken away of the parts featured in Fig. 1;

Fig. 3 is an enlarged transverse sectional view of the apparatus featured in Figs. 1 and 2 illustrating the cutter in its full entry position;

Fig. 4 is a plan sectonal view taken approximately along the line of 4—4 of Fig. 3;

Fig. 5 is a transverse sectional view on reduced scale viewed in the same direction as Fig. 3;

Figs. 6–8 are various detail views of the cutting blade elements; and

Fig. 9 is a transverse sectional view of a modified construction of cutter blade showing a varied form for anchoring the blades in the slicing head.

In the preferred embodiment an irregular prismatic enclosure 11 forms a defining shell of a base structure including a platform 12, Figs. 3 and 5, having a central upstanding portion 13 which functions as a target block and is divided by coordinate slots 14 and 15 into substantially square protuberances 17 excepting the peripheral ones which are deformed from this shape by reason of the cylindrical circumscription. Around the upstanding central portion 13 there is provided a channel clearance or moat 16 and the top of the protuberances 17 are preferably chamfered as at 18 so as to give a flared entrance into the slots 14 and 15 as will be understood later.

While the base 12 is ilustrated as being integral with the shell 11, it will be understood that these elements may be separable or that they may be integrated in any practical manner. Separating these elements will afford better accessibility for cleansing and sanitation, although it will be understood that residual juices such as exude from potatoes and other tubers may be practically eliminated by steaming and scouring, and that solid matter has little, if any, opportunity to become lodged under conditions of proper usage.

Into the prismatic defining shell there is adapted to be fitted in sliding relationship a similarly cross-sectioned head 18 of a cutter assembly which may be made of thin or sheet material and which may include a cylindrical superstructure 19 having a side discharge opening 21 which merges into the head at the shoulder 22 and which is capped with a pressure pad 23 curved so as to be comfortable to the palm of the hand for depression and secured to the superstructure 19 by drive fitting or otherwise. Within the head 18 there is held a retaining ring 24 of annular conformation coordinately slotted in predetermined spacing to receive the intersecting blades 25 and 26 which form the cutter and which blades are so spaced as to coincide with the coordinate slots 14 and 15 of the upstanding member 13.

Both sets of blades 25 and 26 are variously profiled so as to produce an overall concavity in the space defined by their cutting edges 27. The concave space may be parabolic or semi-spherical or may have some other curvature if preferred and will correspond preferably to the curvature which is deformed into the cluster of the protuberances 17 of the upstanding member 13.

In this way vegetables to be processed are substantially encased or nested before penetration into them by the knife edges 27 which is effected as best indicated in Fig. 2 where the vegetable 29 is indicated in a nested position while the flanking edges 31 of the blades have not yet reached the uppermost level of the protuberances 17. As the blades 25 and 26 start to enter into their slicing operation, they are prevented from becoming distorted as may be influenced by variations of density in the vegetable fiber because the flanking portions 31 are guided by the chamfered or fluted approaches 18 for maintaining coordinate alignment through the principal portion of the slicing movement. The protuberances 17 serve to eject all of the vegetable slices beyond the blades 25 and 26 after which the produce cut and conveniently clustered may be discharged through the side opening 21 thereby obviating the inconvenience and troublesomeness of a return stroke through the vegetable as has been required under previously known practices.

The blades 25 will be noted to have slots 33 and the blades 26, slots 34, of symmetrically opposite depth and pattern whereby their coordinate relationship is accomplished through a system of interesting placement. This arrangement locks the blade together and gives further rigidity to the cutting elements whose outermost dimensions will vary between the edges 35 and the edges 36 according to their relative position within the supporting ring 24. The latter member may be slotted to receive marginal entry of the edges 36 or alternatively the ring 24 may be slotted as at 37 to receive a marginal portion of the shoulders 38 for the purpose of securing placement and location. The blades may be removable from the ring 24 or they may be integrated thereto as by swaging, riveting or welding as economy of manufacture and practicability of integration is indicated according to the materials from which these elements are made.

In Fig. 9 there has been shown a further method of integrating the blades to a thin walled securing shell 41 which is fluted to provide recesses 42 within which the extremities of the blades are received and secured as by spot welding. Also, it will be understood that alignment between the cutter head 18 and the shell 11 may be safeguarded by providing a guide project 43 in the housing 11 receivable within a similar or cooperating slot 44 in the head 18.

In this manner there is achieved a vegetable slicer which locates and centers the vegetable in advance of the slicing operation and maintains it securely and properly so that longitudinal cutting can be effected safely and securely with the least amount of likelihood of mishap. There is to be observed a total elimination of pricking anchors such as heretofore required to maintain the vegetable in position preparatory to the slicing operation.

While the present invention has been explained and described with reference to specially chosen illustrations, it will be understood, nevertheless, that numerous modifications and variations may be incorporated in keeping with the essential spirit or scope thereof and without departing from the essence of the invention. It is, accordingly, not intended to be limited in an understanding of the invention to the particulars of the accompanying illustrations nor to the language employed in the foregoing description, except as indicated in the hereunto appended claims.

The invention claimed is:

1. In a cutter for slicing potatoes and the like to prismatic strips, an outer casing, a base at the lower end of the outer casing having an upwardly extending cylindrical portion spaced from the outer casing to form a channel between the casing and the cylindrical portion, said cylindrical portion having a substantially segmento-spherical cup formed centrally of its upper end, said cylindrical portion being provided centrally of the base with a segmento-spherical upstanding body and having intersecting series of spaced slots extending upwardly from said body and opening through the upper surface of the body, a hollow plunger non-rotatably fitted in the casing for vertical sliding movement and having a closed top and a lateral discharge opening extending downwardly from said top, a nest of intersecting cutting blades mounted on said plunger in alinement with said slots, said plunger being unobstructed at its lower end except for said blades, said blades having arcuate edges adapted to fit close to said upstanding body whereby the lower edges of the blades define a cup-shaped recess.

2. In a cutter for slicing potatoes and the like to prismatic strips, an outer casing, a base at the lower end of the outer casing having an upwardly extending cylindrical portion spaced from the outer casing to form a channel between the casing and the cylindrical portion, said cylindrical portion having a substantially segmento-spherical cup formed centrally of its upper end, said cylindrical portion being provided centrally of the base with a segmento-spherical upstanding body and having intersecting series of spaced slots extending upwardly from said body and opening through the upper surface of the body, a hollow plunger having vertical sliding movement in said casing and having its lower end non-rotatably fitting the casing, said plunger having a closed top and having a lateral discharge opening extending downwardly from said closed top, the upper end of the plunger being offset inwardly from the lower end of the plunger to provide a shoulder between the plunger ends, and a nest of intersecting cutting blades mounted in the lower portion of the plunger and having lower lateral extensions lying beneath the plunger shoulder to engage the lower wall of the plunger, said blades being alined with the said slots and having arcuate lower edge portions defining a cup-shaped recess, said plunger being unobstructed at its lower end except for said blades.

3. In a cutter for slicing potatoes and the like to prismatic strips, an outer casing, a base at the lower end of the outer casing having an upwardly extending cylindrical portion spaced from the outer casing to form a channel between the casing and the cylindrical portion, said cylindrical portion having a substantially segmento-spherical cup formed centrally of its upper end, said cylindrical portion being provided centrally of the base with a segmento-spherical upstanding body and having intersecting series of spaced slots extending upwardly from said body and opening through the upper surface of the body, a hollow plunger having vertical sliding movement in said casing and having its lower end non-rotatably fitting the casing, said plunger having a closed top and having a lateral discharge opening extending downwardly from said closed top, the upper end of the plunger being offset inwardly from the lower end of the plunger to provide a shoulder between the plunger ends, a nest of intersecting cutting blades mounted in the lower portion of the plunger and having lower lateral extensions lying beneath the plunger shoulder to engage the lower wall of the plunger, said blades being alined with the said slots and having arcuate lower edge portions defining a cup-shaped recess, said plunger being unobstructed at its lower end except for said blades, and a retaining band for said blades surrounding the blades between the shoulder of the plunger and the shoulders on the blades.

LAURINE R. SHADDUCK.

REFERENCES CITED

The following references are of record in the file of this patent:

UNITED STATES PATENTS

| Number | Name | Date |
| --- | --- | --- |
| 957,118 | Snyder | May 3, 1910 |
| 1,234,724 | Broomfield | July 31, 1917 |
| 1,656,415 | Breithrentz | Jan. 17, 1928 |
| 1,744,795 | Powell | Jan. 28, 1930 |
| 2,495,770 | Rivet | Jan. 31, 1950 |

FOREIGN PATENTS

| Number | Country | Date |
| --- | --- | --- |
| 379,926 | Great Britain | Sept. 8, 1932 |
| 626,608 | Germany | Feb. 28, 1936 |